United States Patent [19]
Yoshihara et al.

[11] Patent Number: 4,741,967
[45] Date of Patent: May 3, 1988

[54] MAGNETIC RECORDING MEDIUM

[75] Inventors: Satoshi Yoshihara; Shigeharu Iijima, both of Kawasaki; Katsuhiko Takano; Mitsuharu Sawamura, both of Yokohama; Masaaki Matsushima, Machida; Hiroyoshi Kishi, Tokyo; Eizo Sasamori, Yokohama; Susumu Ito, Tokyo, all of Japan

[73] Assignee: Canon Kabushiki Kaisha, Tokyo, Japan

[21] Appl. No.: 615,381

[22] Filed: May 30, 1984

[30] Foreign Application Priority Data

Jun. 8, 1983 [JP] Japan ................................ 58-100930
Jun. 8, 1983 [JP] Japan ................................ 58-100931

[51] Int. Cl.$^4$ .............................................. G11B 7/24
[52] U.S. Cl. .................................. 428/469; 428/472; 428/694; 428/900
[58] Field of Search ............... 428/694, 472, 900, 469; 427/132; 369/13, 288; 360/131, 134–135; 365/122; 430/945; 204/192 C

[56] References Cited

U.S. PATENT DOCUMENTS

| 3,460,968 | 8/1969 | Bate et al. ........................... 428/900 |
| 3,492,158 | 1/1970 | Scow et al. ......................... 427/131 |
| 3,498,837 | 3/1970 | Alstad et al. ....................... 427/131 |
| 3,795,542 | 3/1974 | Halaby et al. ...................... 427/130 |
| 3,929,604 | 12/1975 | Shirahata et al. .................. 427/39 |
| 4,124,736 | 11/1978 | Patel et al. ......................... 427/132 |
| 4,260,466 | 4/1981 | Shirahata et al. .................. 427/132 |
| 4,323,629 | 4/1982 | Kunieda et al. .................... 427/132 |
| 4,390,600 | 6/1983 | Ohta et al. ......................... 428/621 |
| 4,418,126 | 11/1983 | Izumi et al. ........................ 428/692 |
| 4,495,242 | 1/1985 | Arai et al. .......................... 428/693 |
| 4,666,759 | 5/1987 | Ohkawa et al. .................... 428/900 |

FOREIGN PATENT DOCUMENTS

| 53811 | 6/1982 | European Pat. Off. . |
| 65898 | 5/1977 | Japan . |
| 76399 | 7/1978 | Japan . |
| 75499 | 7/1978 | Japan . |
| 167134 | 10/1982 | Japan ................................ 428/328 |

OTHER PUBLICATIONS

Meiklejohn; W. H., "Magneto-Optics: A Thermomagnetic Recording Technology", Preceedings of the IEEE, vol. 74, No. 11, Nov. 1986.

Primary Examiner—George F. Lesmes
Assistant Examiner—William M. Atkinson
Attorney, Agent, or Firm—Fitzpatrick, Cella, Harper & Scinto

[57] ABSTRACT

A magnetic recording medium comprising a substrate, a magnetic recording layer made of an amorphous magnetic film on the substrate, and an anticorrosive layer prepared by oxidation treatment of the surface of the amorphous magnetic film.

9 Claims, 1 Drawing Sheet

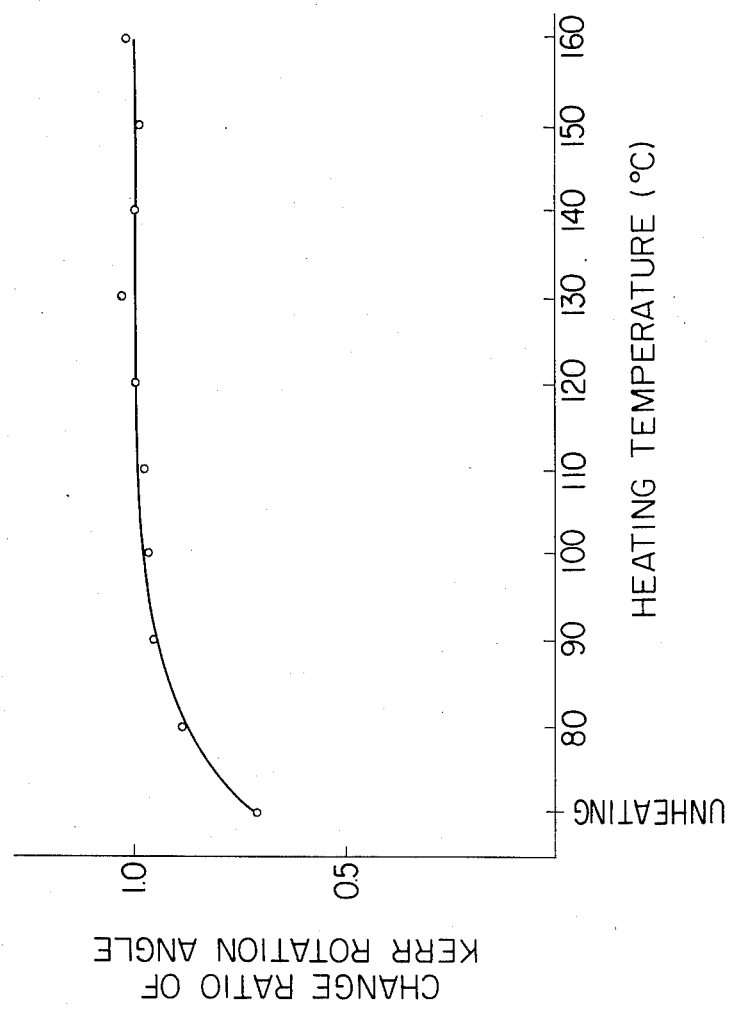

MAGNETIC RECORDING MEDIUM

BACKGROUND OF THE INVENTION

1. Field of the Invention

The present invention relates to magnetic recording media for optomagnetic memory devices, magnetic recording devices, and display elements, and more particularly to improvements in optomagnetic recording media from which the stored information can be read out by utilizing a magnetooptic effect such as the Kerr effect or the Faraday effect.

2. Description of the Prior Art

Various optomagnetic recording media are known, including, for example; polycrystalline thin films of MnBi and MnCuBi; amorphous thin films of GdCo, GdFe, TdFe, DyFe, GdTbFe, TbDyFe, GdFeCo, TbFeCo, and GdTbCo; and a single-crystalline film of GdIG.

Of these films, the amorphous films are regarded today as superior optomagnetic recording media, in view of their film-forming property which permits them to be made up into large area films at room temperature or around it, their effectiveness for writing signals with small quantities of thermal energy generated by irradiation of light, and their effectiveness for reading the written signals in high S/N ratios. In particular, GdTbFe is best suited for optomagnetic recording media because of its large Kerr rotation angle and its Curie point of about 150° C.

However, the amorphous magnetic materials used for magnetic recording media including GdTbFe have the drawback of low corrosion resistance. That is, these materials, in contact with the atmosphere or water vapor slowly, deteriorate in magnetic properties and finally are completely oxidized and become transparent.

For the purpose of eliminating this drawback, there have been proposed to date for example, an optomagnetic recording medium having a transparent protective layer of $SiO_2$, SiO, or the like on the upper side of the recording layer and a recording medium in disk form sealed in inert gas.

These magnetic recording media, however, are unsatisfactory in corrosion resistance, still having the drawback of being subject to oxidation, which corrosion thereby causes the media to deteriorate in magnetic properties.

SUMMARY OF THE INVENTION

An object of the invention is to provide a magnetic recording medium which has sufficient corrosion resistance to maintain the magnetic properties.

The above and other objects of the invention is achieved with a magnetic recording medium comprising a substrate, a magnetic recording layer made of an amorphous magnetic film on the substrate, and an anticorrosive layer prepared by oxidizing the surface of the amorphous magnetic film.

BRIEF DESCRIPTION OF THE DRAWING

FIG. 1 illustrates changes in the Kerr rotation angle of specimens oxidation-treated at different temperatures and of an untreated specimen, during the 100 hours' corrosion resistance test conducted in Example 1 of the invention.

DETAILED DESCRIPTION OF EMBODIMENTS OF THE INVENTION

Suitable materials for the substrate of the magnetic recording medium according to the invention include glass, metals, quartz, acrylic resins, polycarbonate resin, and poly(ethylene terephthalate) resin (e.g. the resin of the tradename Mylar). Suitable materials for the amorphous magnetic film include GdTbFe, GdTbFeCo, GdCo, GdFe, TbFe, DyFe, TbDyFe, and the like.

In the magnetic recording medium of the present invention, the anticorrosive layer is prepared by oxidation treatment of the amorphous magnetic film on its opposite face to the substrate. The portion remaining unoxidized of the amorphous magnetic film functions as a magnetic recording layer, This oxidation treatment can be accomplished by various means including thermal oxidation in the air or oxygen-containing gas, plasma oxidation in a current of oxygen, wet anodic oxidation, dry or wet oxidation with an oxidizing agent, and the like.

The thermal oxidation in air or oxygen-containing gas is carried out by heating the amorphous magnetic film formed on the substrate, in air or oxygen-containing gas at a temperature of generally 80°–400° C. for a period of up to 24 hours. The heating at temperatures above 400° C. is undesirable since the crystallization of the amorphous magnetic film takes place at such temperatures. Particularly preferred conditions of the heating are at 130°–250° C. for 5–120 minutes.

The plasma oxidation is carried out by oxidizing the surface of the amorphous magnetic film formed on the substrate, for 1–30 minutes in a plasma of oxygen under favorable conditions selected from the pressures 1–300 m Torr, the oxygen flow rates 3–200 SCCM (standard state cc/min.), and the inputs 50–1000 W.

The wet anodic oxidation is carried out, for instance, as follows: The amorphous magnetic film formed on the substrate is anodic-oxidized in an electrolytic bath with itself as anode and with, for example, platinum, carbon, or stainless steel as cathode. For the electrolytic bath, there is used, for example, a sodium hydroxide solution, sodium hydroxide-disodium hydrogenphosphate solution, or sodium hydroxide-sodium citrate solution.

The dry or wet oxidation with an oxidizing agent is carried out by contacting an oxidizing agent such as ozone, hydrogen peroxide, potassium permanganate, or potassium peroxide in gaseous, solid, or solution form with the amorphous magnetic film formed on the substrate, if necessary, under heating.

The thickness of the anticorrosive layer prepared by the oxidation of the surface of the amorphous magnetic film depends upon the thickness of the magnetic thin film. For instance, the suitable thickness of the anticorrosive layer is 50–1000 Å when thickness of the magnetic thin film is 2000 Å. The anticorrosive layer, if thinner than the lower limit, cannot prevent the corrosion of the magnetic film, and if thicker than the upper limit, results in a low sensitivity of the optomagnetic recording medium for writing and reading.

When the present invention is applied to optomagnetic recording media, the corrosion resistance can be improved more by additional formation of a known protective layer or a reflection layer, anti-reflection layer, or heat-insulation layer each acting also as a protective layer, on the anticorrosive layer after formation thereof as described above. It is also possible to form a heat-insulation layer and an anti-reflection layer between the substrate and the magnetic recording layer (the amorphous magnetic film), in the series from the substrate side. Moreover, other elements such as Cr, Si, Ti, Si-Cr, or Cr-Al can be incorporated into the amorphous magnetic layer. This is particularly favorable since the corrosion resistance of the magnetic recording layer itself is improved thereby.

A pair of optomagnetic recording media prepared according to the invention can be laminated upon each other to make up a known air sandwich structure or a laminated structure.

According to the present invention, a magnetic recording medium superior to the prior art media in corrosion resistance can be obtained by oxidizing the surface of the amorphous magnetic thin film to form an anticorrosive layer without deteriorating the magnetic property thereof. When this magnetic recording medium is, for example, an optomagnetic recording medium, the writing or erasing is carried out by projecting light from the substrate side.

The invention is illustrated in more detail by the following examples wherein it is applied to optomagnetic recording media.

EXAMPLE 1

GdTbFeCo was deposited to a thickness of 1500 Å on 10 glass plates of 1.1 mm thickness by using a high-frequency sputtering apparatus. Nine plates of the prepared specimens were heated in the air for 30 minutes at 80, 90, 100, 110, 120, 130, 140, 150, and 160° C., respectively, to oxidize the surfaces of the magnetic recording layers thereby forming anticorrosive layers. The thus treated specimens and the untreated specimen were tested for corrosion resistance in a 70° C., 85% RH thermo-hygrostat. The results are as shown in Table 1, wherein the pinhole is a defect caused by corrosion in the recording layer. The more appearance of pincholes indicates that the corrosion has the more proceeded.

FIG. 1 shows results of measuring the Kerr rotation angles of the specimens with polarized light incident on the glass plate side after the corrosion resistance test was continued for 100 hours. The number on the abscissa indicates the temperature of heating the specimens and the number on the ordinate indicates the ratio of the Kerr rotation angle after 100 hours' duration of the test to that before the oxidation process. As is evident from FIG. 1, the specimens oxidation-treated at temperatures of 130° C. and higher indicated no difference between the Kerr rotation angles before the oxidation process, and after the process and after the text.

EXAMPLE 2

A glass plate of 1.1 mm thickness was overlaid in series with a 7000-Å thick heat-insulation layer made of a polyacrylate (supplied by Yunichika Co., Ltd. under the tradename U-100), a 900-Å thick anti-reflection layer of SiO, and a 2000-Å thick GdTbFe layer, which was formed by using a high-frequency sputtering apparatus. The resulting plate was heated in the air at 140° C. for 30 minutes to oxidize the surface of the GdTbFe layer, thereby forming an anticorrosive layer on the top. The optomagnetic recording medium thus obtained was tested for corrosion resistance at 70° C. and 85% RH. NO pinhole was observed after continuation of the test for 100 hours.

EXAMPLE 3

A 1.5-mm thick aluminum plate, as substrate, was overlaid in series with a 2-μ thick heat-insulation layer made of a polyimide (supplied by Hitachi Kasei Co., Ltd. under the tradename PIQ), and a 1500-Å thick GdCo layer by use of a high-frequency sputtering apparatus. The resulting plate was heated at 160° C. in the vacuum chamber of the high-frequency sputtering apparatus into which oxygen gas had been introduced to a pressure of 300 m Torr, thereby oxidizing the surface of

TABLE 1

| Specimen treatment conditions | Duration of corrosion resistance test Pinhole appearance state | | | | | | |
|---|---|---|---|---|---|---|---|
| | 0 min. | 15 min. | 30 min. | 45 min. | 1 hr. | 10 hr. | 100 hr. |
| Untreated | no pinhole | Many pinholes | Many pinholes | — | — | — | — |
| Heat at 80° C. for 30 min. | no pinhole | Many pinholes | Many pinholes | — | — | — | — |
| Heated at 90° C. for 30 min. | no pinhole | Many pinholes | Many pinholes | — | — | — | — |
| Heated at 100° C. for 30 min. | no pinhole | Many pinholes | Many pinholes | Many pinholes | — | — | — |
| Heated at 110° C. for 30 min. | no pinhole | Few pinholes | Few pinholes | Many pinholes | Many pinholes | — | — |
| Heated at 120° C. for 30 min. | no pinhole | No pinhole | Few pinholes | Few pinholes | Few pinholes | Few pinholes | Few pinholes |
| Heated at 130° C. for 30 min. | no pinhole | No pinhole | No pinhole | No pinhole | No pinhole | No pinhole | No pinhole |
| Heated at 140° C. for 30 min. | no pinhole | No pinhole | No pinhole | No pinhole | No pinhole | No pinhole | No pinhole |
| Heated at 150° C. for 30 min. | no pinhole | No pinhole | No pinhole | No pinhole | No pinhole | No pinhole | No pinhole |
| Heated at 160° C. for 30 min. | no pinhole | No pinhole | No pinhole | No pinhole | No pinhole | No pinhole | No pinhole | the magnetic recording layer. Further, a 900 Å thick anti-reflection layer of SiO was laid on the oxidized magnetic recording layer in the above high-frequency sputtering apparatus.

The optomagnetic recording medium thus treated was tested for corrosion resistance at 70° C. and 85% RH for 100 hours, with the result that no pinhole appeared.

EXAMPLE 4

Two acrylic resin substrates of 1.2 mm thickness were overlaid each with a 1500 Å thick GdTbFeCo by using a high-frequency sputtering apparatus. One of the resulting plates was heated in the air at 80° C. for 24 hours to oxidize the surface of the GdTbFeCo layer, thus forming an anticorrosive layer.

The oxidation-treated and untreated optomagnetic recording media were tested for corrosion resistance in a 70° C., 85% RH thermo-hygrostat. The results are as shown in Table 2.

TABLE 2

| Spec-imen | Duration of corrosion resistance test Pinhole appearance state | | | | | | |
|---|---|---|---|---|---|---|---|
| | 0 min. | 15 min. | 30 min. | 45 min. | 1 hr. | 10 hr. | 50 hr. |
| Un-treated | No pinhole | Many pin-holes | Many pin-holes | — | — | — | — |
| Oxi-dation-treated | No pinhole | No pinhole | No pinhole | No pinhole | No pin-hole | No pinhole | No pinhole |

After completion of the corrosion test, Kerr rotation angles of the specimens were measured with polarized light incident on the substate side. The oxidation-treated specimen showed no difference between the Kerr rotation angles before the oxidation process and after the test.

EXAMPLE 5

Similarly to Example 4, two acrylic resin substrates were overlaid each with a GdTbFeCo layer. One of the resulting plates was heated for 20 minutes in an oxygen plasma at 90 m Torr, an oxygen flow rate of 22 SCCM, and an input of 200 W, to oxidize the surface of the GdTbFeCo layer, forming an anticorrosive layer.

The oxidation-treated and untreated optomagnetic recording media were tested for corrosion resistance in a 70° C., 85% RH thermo-hygrostat. The results are as shown in Table 3.

TABLE 3

| Spec-imen | Duration of corrosion resistance test Pinhole appearance state | | | | | | |
|---|---|---|---|---|---|---|---|
| | 0 min. | 15 min. | 30 min. | 1 hr. | 10 hr. | 50 hr. | 100 hr. |
| Un-treated | No pinhole | Many pin-holes | Many pin-holes | — | — | — | — |
| Oxi-dation-treated | No pinhole | No pinhole | No pinhole | No pin-hole | No pinhole | No pinhole | No pinhole |

After completion of the corrosion test, Kerr rotation angles of the specimens were measured with polarized light incident on the substrate side. The oxidation-treated specimen showed no difference between the Kerr rotation angles before the oxidation process and after the test.

EXAMPLE 6

Similary to Example 2, two glass substrates were overlaid each in series with a heat-insulation layer, anti-reflection layer, and GdTbFe layer. One of the resulting plates was heated for 20 minutes in an oxygen plasma at 110 m Torr, an oxygen flow rate of 20 SCCM, and an input of 200 W, to oxidize the surface of the GdTbFe layer, forming an anticorrosive layer.

The oxidation-treated and untreated optomagnetic recording media were tested for corrosion resistance in a 70° C., 85% RH thermo-hygrostat. The results are as shown in Table 4.

TABLE 4

| Spec-imen | Duration of corrosion resistance test Pinhole appearance state | | | | | | |
|---|---|---|---|---|---|---|---|
| | 0 min. | 15 min. | 30 min. | 45 min. | 1 hr. | 10 hr. | 50 hr. |
| Un-treated | No pinhole | Many pin-holes | Many pin-holes | — | — | — | — |
| Oxi-dation-treated | No pinhole | No pinhole | No pinhole | No pin-hole | No pin-hole | No pinhole | No pinhole |

After completion of the corrosion test, Kerr rotation angles of the specimens were measured with polarized light incident on the substrate side. The oxidation-treated specimen showed no difference between the Kerr rotation angles before the oxidation process and after the test.

EXAMPLE 7

Four kinds of optomagnetic recording media were prepared in the same manner as in Example 6 but using GdCo, GdFe, TbFe, and TbDyFe, respectively, in the place of GdTbFe. In the recording media, tested for corrosion resistance under the same conditions as in Example 6, no pinhole appeared even after continuation of the test for 50 hours.

What we claim is:

1. An optomagnetic recording medium comprising:
   a transparent substrate;
   a magnetic recording layer of an amorphous magnetic film formed from a rare earth-transition metal alloy on said substrate;
   an anticorrosive layer prepared by oxidation treatment of a first surface of the amorphous magnetic film, which first surface is opposite to a second surface thereof facing said substrate; and a reflection layer formed on said anticorrosive layer.

2. The optomagnetic recording medium of claim 1, wherein the amorphous magnetic film is made of one of the alloys GdCo, GdFe, TbFe, TbDyFe, GdTbFe, and GdTbFeCo.

3. The optomagnetic recording medium of claim 1, wherein the oxidation treatment is carried out by oxidizing the surface of the amorphous magnetic film in an oxygen plasma for 1–30 minutes under the conditions of pressure 1–300 m Torr, oxygen flow rate 3–200 SCCM (standard state cc/min.), and input 50–1000 W.

4. The optomagnetic recording medium of claim 1, wherein the oxidation treatment is carried out by anodic oxidation in an electrolytic bath with the amorphous magnetic film as anode.

5. The optomagnetic recording medium of claim 1, wherein the oxidation treatment is carried out by contacting an oxidizing agent in gaseous, solid, or solution form with the surface of the amorphous magnetic film.

6. The optomagnetic recording medium of claim 1, further comprising a heat-insulation layer and an anti-reflection layer, said heat-insulation and anti-reflection layers being formed between said substrate and said magnetic recording layer, in series from the side of said substrate.

7. The optomagnetic recording medium of claim 1, wherein one of elements Cr, Si, Ti, Si-Cr, and Cr-Al are incorporated into said amorphous magnetic film.

8. The optomagnetic recording medium of claim 1, wherein the oxidation treatment is carried out by heating the surface of the amorphous magnetic film in the air or oxygen-containing gas at a temperature of 80°–400° C. for a period of up to 24 hours.

9. The optomagnetic recording medium of claim 8, wherein the oxidation treatment is carried out heating the surface of the amorphous magnetic film in the air or oxygen-containing gas at a temperature of 130°–250° C. for a period of 5–120 minutes.

* * * * *